(12) United States Patent
Bergevin et al.

(10) Patent No.: US 6,988,308 B2
(45) Date of Patent: Jan. 24, 2006

(54) METHOD OF INITIALIZING HARD BIAS OF A MAGNETIC READ HEAD

(75) Inventors: Christopher William Bergevin, San Jose, CA (US); Carol Inouye Chiu, San Jose, CA (US); Robert Yuan-Shih Li, Fremont, CA (US); Albert Shou-Chi Su, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 675 days.

(21) Appl. No.: 10/053,734

(22) Filed: Jan. 18, 2002

(65) Prior Publication Data

US 2003/0135983 A1    Jul. 24, 2003

(51) Int. Cl.
G11B 5/127    (2006.01)
H04R 31/00    (2006.01)

(52) U.S. Cl. ............... 29/603.03; 29/417; 29/603.08; 29/603.14; 29/603.15; 29/603.16; 29/603.18; 216/65; 360/324.1; 360/324.11; 360/324.12; 360/324.2; 360/317; 427/127; 427/128; 451/4; 451/51

(58) Field of Classification Search ............... 29/417, 29/603.08, 603.14–603.16, 603.18; 216/65; 360/324.1, 324.11, 324.12, 324.2, 314, 317; 427/127, 128; 451/4, 51
See application file for complete search history.

(56) References Cited

U.S. PATENT DOCUMENTS

| | | | |
|---|---|---|---|
| 5,576,908 A | 11/1996 | Garfunkel et al. | ............. 360/66 |
| 5,664,319 A | 9/1997 | Abboud et al. | .......... 29/603.08 |
| 5,783,981 A | 7/1998 | Abboud et al. | ............. 335/284 |
| 5,969,523 A | 10/1999 | Chung et al. | ................ 324/252 |
| 5,974,657 A * | 11/1999 | Fox et al. | ................ 29/603.08 |
| 6,181,533 B1 * | 1/2001 | Pokhil | ........................ 360/324 |
| 6,500,570 B2 * | 12/2002 | Hasegawa et al. | .......... 428/692 |
| 6,785,102 B2 * | 8/2004 | Freitag et al. | ......... 360/324.11 |

FOREIGN PATENT DOCUMENTS

JP    2000276720 A    * 10/2000

OTHER PUBLICATIONS

"A Ni-Mn spin valve for high density recording"; Lin, T.; Mauri, D.; Luo, Y.; Magnetics, IEEE Transactions on vol. 36, Issue 5, Sep. 2000 pp. 2563-2565.*

* cited by examiner

Primary Examiner—A. Dexter Tugband
Assistant Examiner—Paul D. Kim
(74) Attorney, Agent, or Firm—Ervin F. Johnston

(57) ABSTRACT

Hard biasing of a magnetoresistive sensor or a spin valve sensor in a magnetic read head is initialized by repeatedly applying a magnetic field to the hard biasing at any level of fabrication of the magnetic read head or any combination of levels of fabrication of the read head such as at the wafer level, row bar level, single slider level, head gimbal assembly (HGA) level and/or head stack assembly (HSA) level.

13 Claims, 7 Drawing Sheets

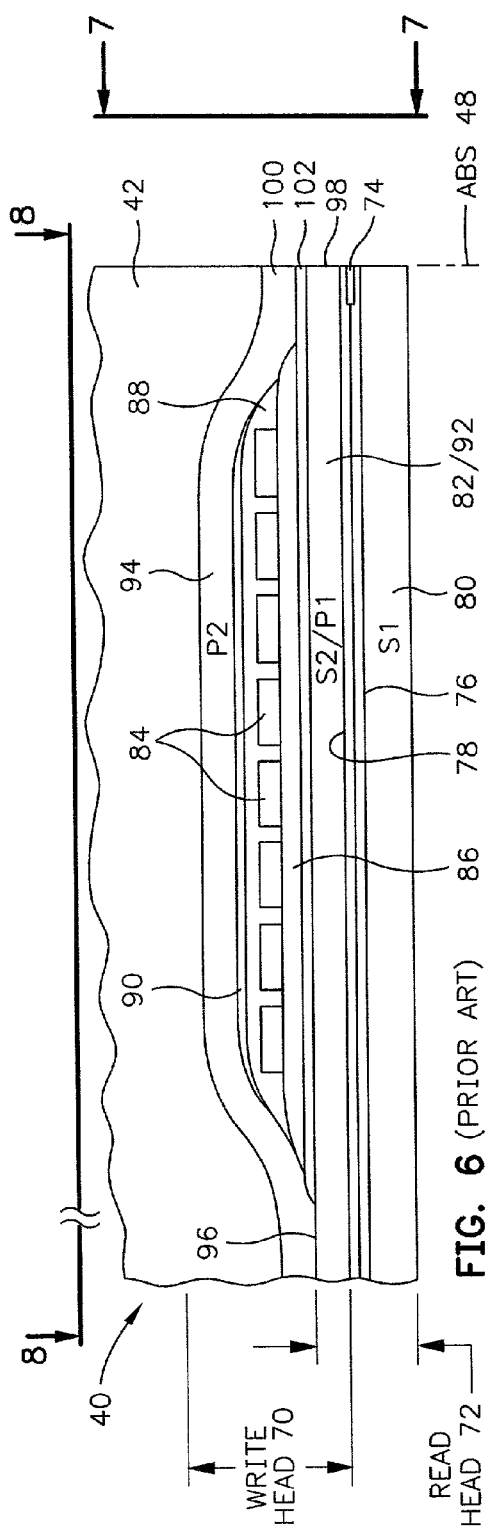
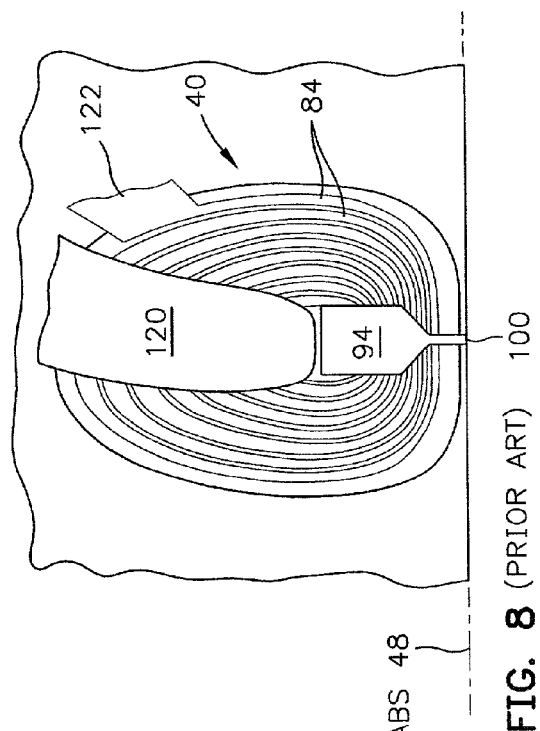
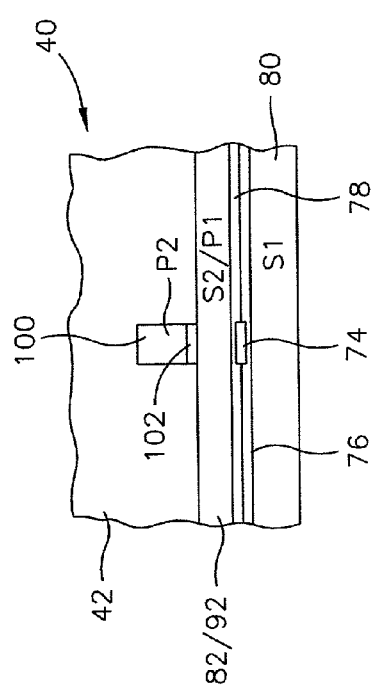

(ABS)

METHOD OF INITIALIZING HARD BIAS OF A MAGNETIC READ HEAD

BACKGROUND OF THE INVENTION

1. Field of the Invention

The present invention relates to a method of initializing hard bias of a magnetic read head and, more particularly, to enhancing hard bias layers which longitudinally bias and stabilize the free layer of a read sensor.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic field signals from the rotating disk. The read and write heads are connected to processing circuitry that operates according to a computer program to implement the writing and reading functions.

An exemplary high performance read head employs a spin valve sensor for sensing the magnetic field signals from the rotating magnetic disk. The sensor includes a nonmagnetic electrically conductive first spacer layer sandwiched between a ferromagnetic pinned layer structure and a ferromagnetic free layer structure. An antiferromagnetic pinning layer interfaces the pinned layer structure for pinning a magnetic moment of the pinned layer structure 90° to an air bearing surface (ABS) wherein the ABS is an exposed surface of the sensor that faces the magnetic disk. Two leads, designated R+ and R−, are connected to two ends of the spin valve sensor for conducting a sense current therethrough. The magnetic moment of the free layer structure is free to rotate upwardly and downwardly with respect to the ABS from a quiescent or bias point position in response to positive and negative magnetic field signals from a rotating magnetic disk. The quiescent position, which is parallel to the ABS, is the position of the magnetic moment of the free layer structure with the sense current conducted through the sensor in the absence of external magnetic field signals.

The thickness of the spacer layer is chosen so that shunting of the sense current and a magnetic coupling between the free and pinned layer structures are minimized. This thickness is typically less than the mean free path of electrons conducted through the sensor. With this arrangement, a portion of the conduction electrons are scattered at the interfaces of the spacer layer with the pinned and free layer structures. When the magnetic moments of the pinned and free layer structures are parallel with respect to one another scattering is minimized and when the magnetic moments are antiparallel scattering is maximized. Changes in scattering changes the resistance of the spin valve sensor as a function of $\cos \theta$, where $\theta$ is the angle between the magnetic moments of the pinned and free layer structures. The sensitivity of the sensor is quantified as magnetoresistive coefficient $dr/R$ where $dr$ is the change in the resistance of the sensor as the magnetic moment of the free layer structure rotates from a position parallel with respect to the magnetic moment of the pinned layer structure to an antiparallel position with respect thereto and R is the resistance of the sensor when the magnetic moments are parallel.

In addition to the spin valve sensor the read head includes nonmagnetic electrically nonconductive first and second read gap layers and ferromagnetic first and second shield layers. The spin valve sensor is located between the first and second read gap layers and the first and second read gap layers are located between the first and second shield layers. In the construction of the read head the first shield layer is formed first followed by formation of the first read gap layer, the spin valve sensor, the second read gap layer and the second shield layer. Spin valve sensors are classified as a top or a bottom spin valve sensor depending upon whether the pinning layer is located near the bottom of the sensor close to the first read gap layer or near the top of the sensor close to the second read gap layer. Spin valve sensors are further classified as simple pinned or antiparallel pinned depending upon whether the pinned layer structure is one or more ferromagnetic layers with a unidirectional magnetic moment or a pair of ferromagnetic layers that are separated by a coupling layer with magnetic moments of the ferromagnetic layers being antiparallel. Spin valve sensors are still further classified as single or dual wherein a single spin valve sensor employs only one pinned layer and a dual spin valve sensor employs two pinned layers with the free layer structure located therebetween.

First and second hard bias layers typically abut first and second side surfaces of the spin valve sensor for longitudinally biasing the free layer. Longitudinal biasing promotes a single magnetic domain state of the free layer so that its operation is more predictable. Without proper biasing the magnetic moment of the free layer, which should be parallel to the ABS and parallel to the major thin film planes of the sensor, may not return to its parallel quiescent position after being rotated by a field signal from the rotating magnetic disk. Furthermore, a less than sufficient longitudinal biasing will encourage the formation of edge domains and their subsequent movements resulting in output signal instabilities.

The read head in a hard disk drive (HDD) is first mounted on a head gimbal assembly (HGA) which is then swaged onto a head stack assembly (HSA). An HSA may contain one or more HGAs. Two types of HGAs, UP and DOWN or DN, are usually required to read data from a single rotating magnetic media. The UP HGA typically refers to the HGA that has its ABS facing up to the bottom of the magnetic media while the DN HGA is the one with its ABS facing down the top surface of the media when it is in a horizontal position. It is not unusual to have read amplitude instability failure ratios of two or more to one between UP and DN HGAs. The UP and DN HGAs generally come from separate wafers because their structures are generally mirror images of each other. For ease of identification, the wafers corresponding to the UP and DN HGAs will be referred to as the UP and DN wafers, respectively.

In practice, the deposition of the hard bias layers may not be uniform. After forming a plurality of magnetic head assemblies in rows and columns on a wafer the prior art typically initializes the hard bias layers of the magnetic heads by subjecting the wafer to a magnetic field which is oriented parallel to the major thin film planes of the sensor layers in a direction along the length of the free layer of the sensor. Specifically, if the two ends of the sensor are labeled R+ and R−, then the applied magnetic field direction is from R− toward R+. Typically the same magnetic field orientation is then reinforced during a subsequent initialization process at either the HGA level and/or at the HSA level. After mounting a HSA in a magnetic disk drive the sense current is applied in a direction opposite to the magnetic field direction of the hard bias layers. In spite of one or more subsequent re-initializations the read amplitude differences between magnetic heads in the magnetic disk drive can have the aforementioned fallout rate which can cause the drive to have unrecoverable error events.

SUMMARY OF THE INVENTION

Instead of re-initializing the hard bias layers in the same direction, as taught by the prior art, the present invention re-initializes the hard bias layers in an opposite direction to a previous initialization. Accordingly, if the original initialization is in a first direction at the wafer level the next initialization is antiparallel to the direction of the first initialization. Said next initialization may be at the wafer level, the row level, the individual magnetic head level, the HGA level or the HSA level. Further, the invention may include one or more additional initializations beyond said next initialization providing each initialization is in a direction antiparallel to the direction of the previous initialization. Accordingly, any number of such initializations may be implemented numerous times at any one level or separate initializations may be implemented at any combination of levels. By initializing the hard bias layers sequentially in opposite directions the magnetic instability of hard bias layers have been dramatically reduced. It is hypothesized that by flipping the HB field direction, the residual domain walls are swept away or the domain vortex is moved to the more stable end. Accordingly, the present invention promotes improved read amplitude stability at the HGA, HSA and HDD levels.

An object of the present invention is to provide a method of initialization of a hard bias layer or layers which provides predictable responses of a free layer of a read sensor to field signals from a rotating magnetic disk.

Another object is to provide a method of initializing a hard bias layer or hard bias layers in each of a plurality of magnetic head assemblies which improves uniform longitudinal biasing by the hard biasing layer or layers which, in turn, promotes improved stability of read amplitude signals by the magnetic head assemblies in a magnetic disk drive.

Other objects and attendant advantages of the invention will be appreciated upon reading the following description taken together with the accompanying drawings.

BRIEF DESCRIPTION OF THE DRAWINGS

FIG. 6 is a partial view of the slider and a merged magnetic head as seen in plane 6—6 of FIG. 2;

FIG. 7 is a partial ABS view of the slider taken along plane 7—7 of FIG. 6 to show the read and write elements of the magnetic head;

FIG. 8 is a view taken along plane 8—8 of FIG. 6 with all material above the coil layer and leads removed;

DESCRIPTION OF THE PREFERRED EMBODIMENTS

Magnetic Disk Drive

Figure 1:
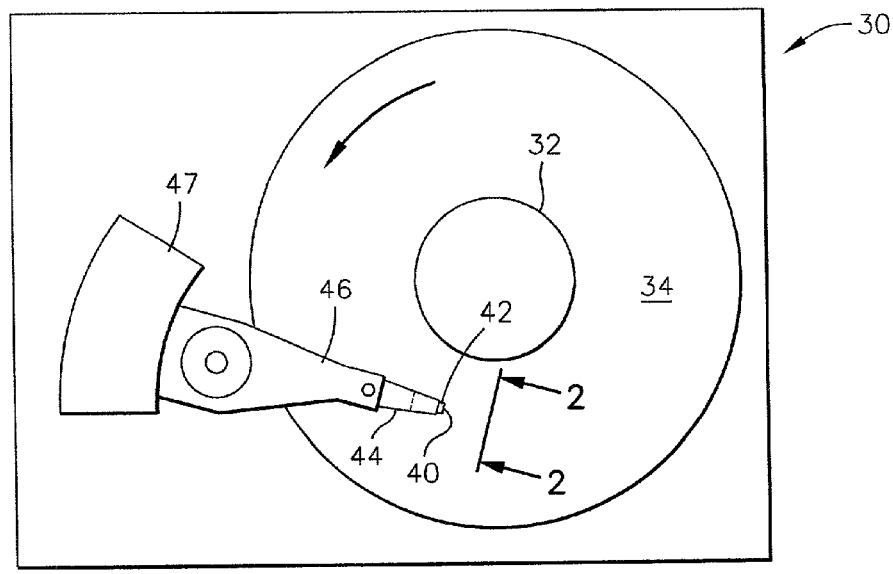
FIG. 1 is a plan view of an exemplary magnetic disk drive.
Figure 2:
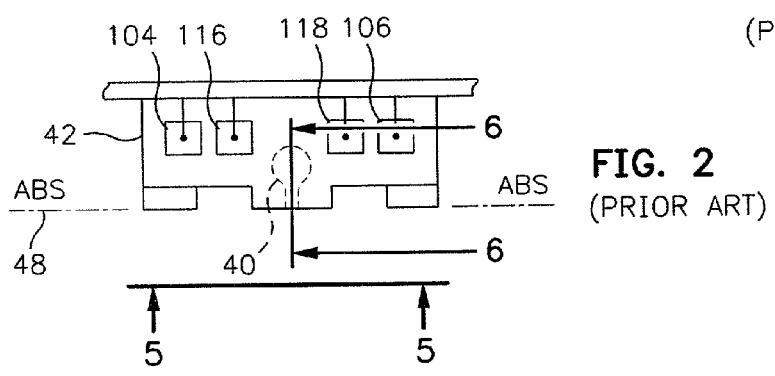
FIG. 2 is an end view of a slider with a magnetic head of the disk drive as seen in plane 2—2 of FIG. 1.
Figure 3:
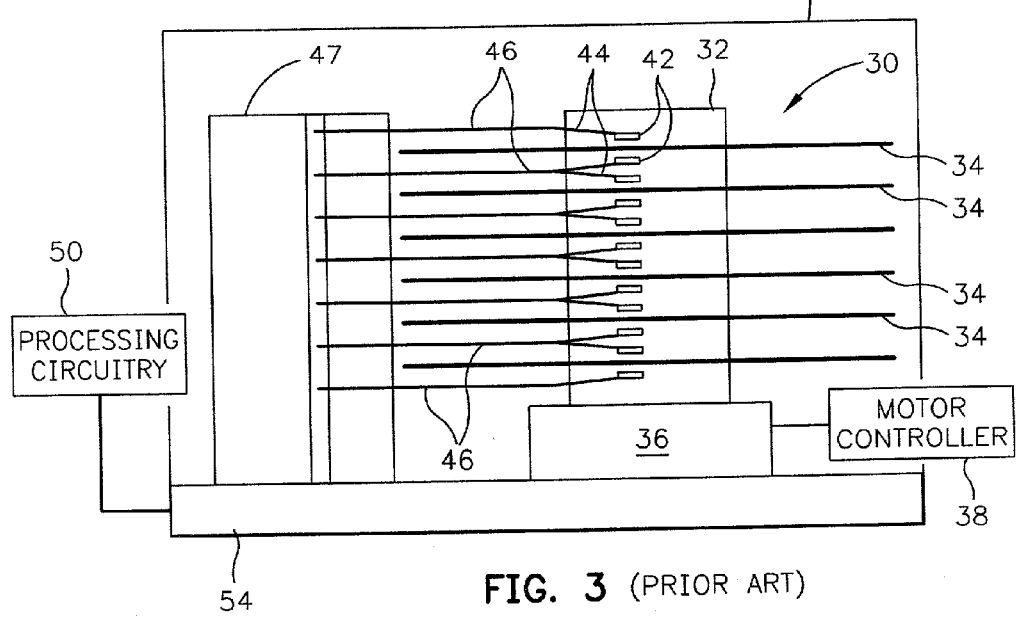
FIG. 3 is an elevation view of the magnetic disk drive wherein multiple disks and magnetic heads are employed.
Figure 4:
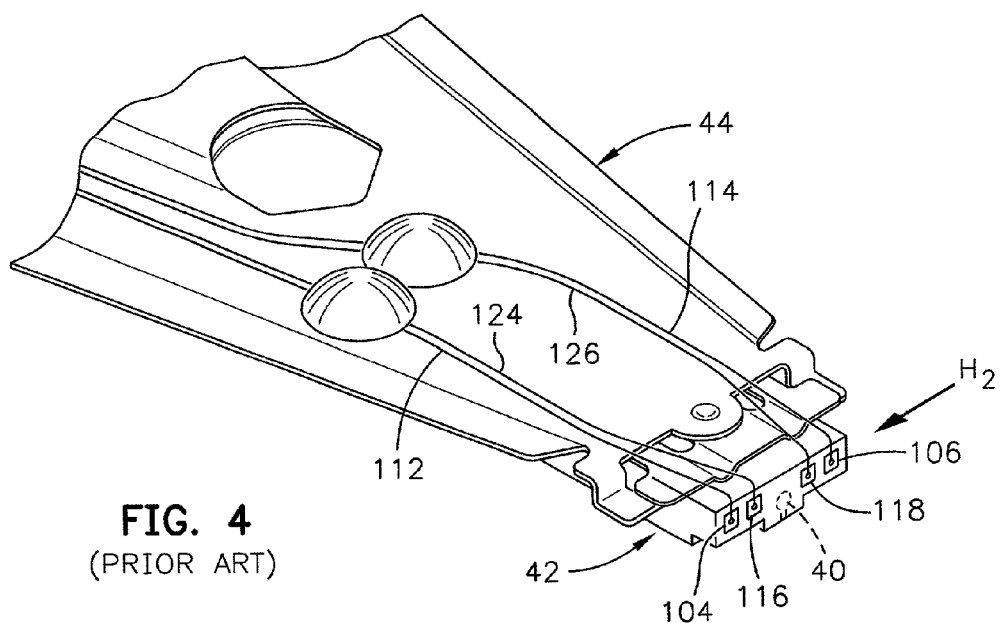
FIG. 4 is an isometric illustration of an exemplary suspension system for supporting the slider and magnetic head.
Figure 5:
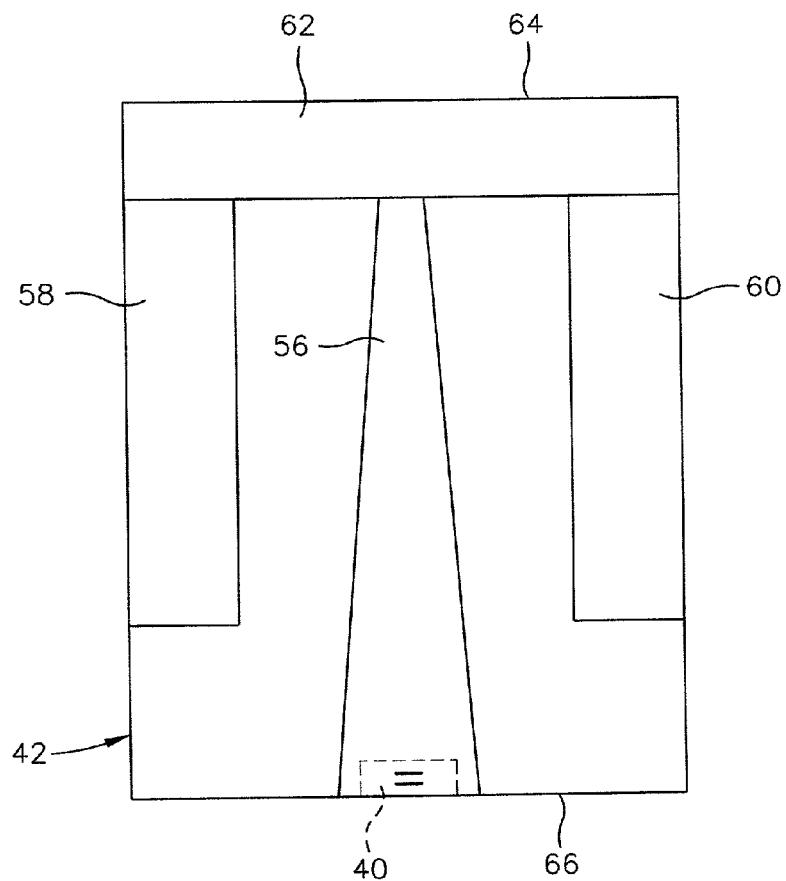
FIG. 5 is an ABS view of the magnetic head taken along plane 5—5 of FIG. 2.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3. FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

FIG. 6 is a side cross-sectional elevation view of a merged magnetic head 40, which includes a write head portion 70 and a read head portion 72, the read head portion employing a spin valve sensor 74. FIG. 7 is an ABS view of FIG. 6. The spin valve sensor 74 is sandwiched between nonmagnetic electrically nonconductive first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3. The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. Since the second shield layer 82 and the first pole piece layer 92 are a common layer this head is known as a merged head. In a piggyback head the second shield layer and the first pole piece layer are separate layers which are separated by a nonmagnetic layer. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
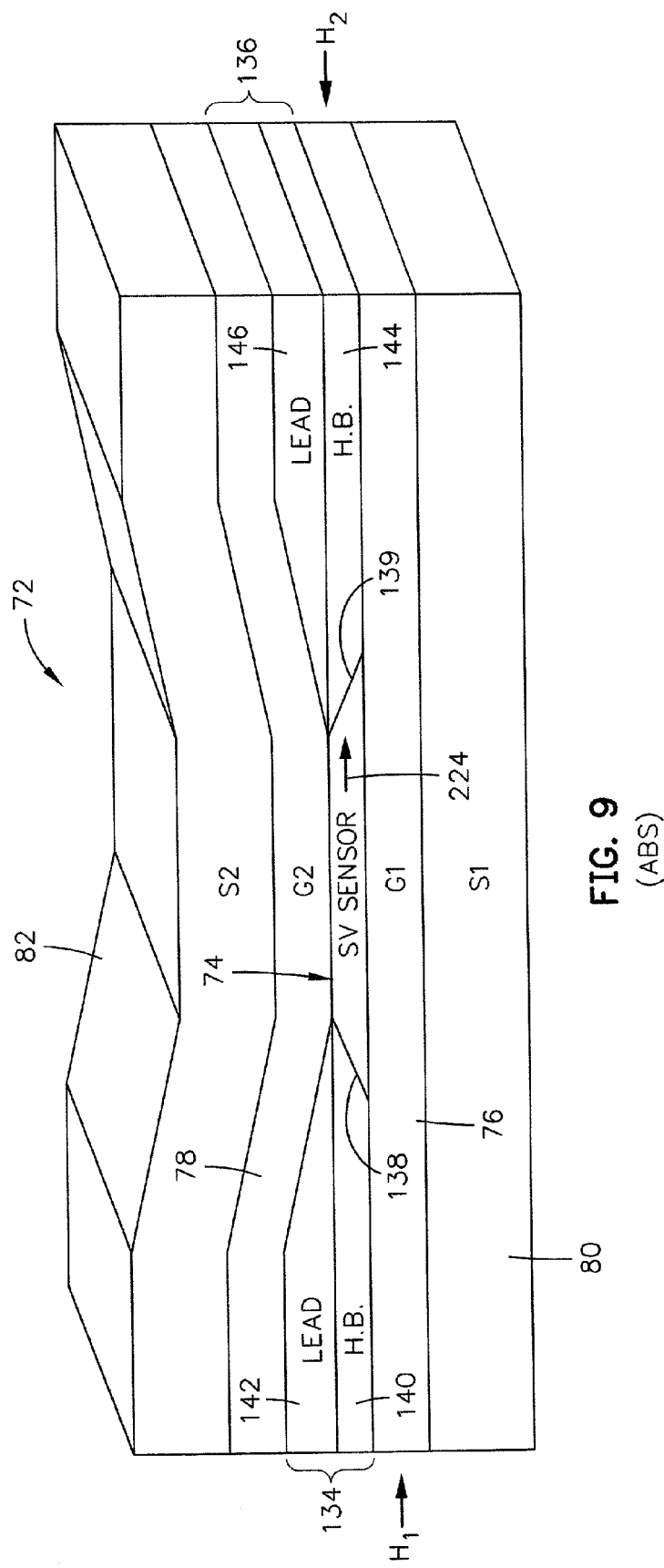
FIG. 9 is an enlarged isometric illustration of the read head with a spin valve sensor.

FIG. 9 is an isometric ABS illustration of the read head 72 shown in FIG. 6. First and second hard bias and lead layers 134 and 136 are connected to first and second side surfaces 138 and 139 of the spin valve sensor 74. This connection is known in the art as a contiguous junction and is fully described in commonly assigned U.S. Pat. No. 5,018,037 which is incorporated by reference herein. The first hard bias and lead layers 134 include a first hard bias layer (HB) 140 and a first lead layer 142 and the second hard bias and lead layers 136 include a second hard bias layer (HB) 144 and a second lead layer 146. The hard bias layers 140 and 144 cause magnetic fields to extend longitudinally through the spin valve sensor 74 for stabilizing magnetic domains therein. The spin valve sensor 74 and the first and second hard bias and lead layers 134 and 136 are located between the first and second read gap layers 76 and 78, the first and second read gap layers 76 and 78 are, in turn, located between the ferromagnetic first and second shield layers 80 and 82.

Figure 10:
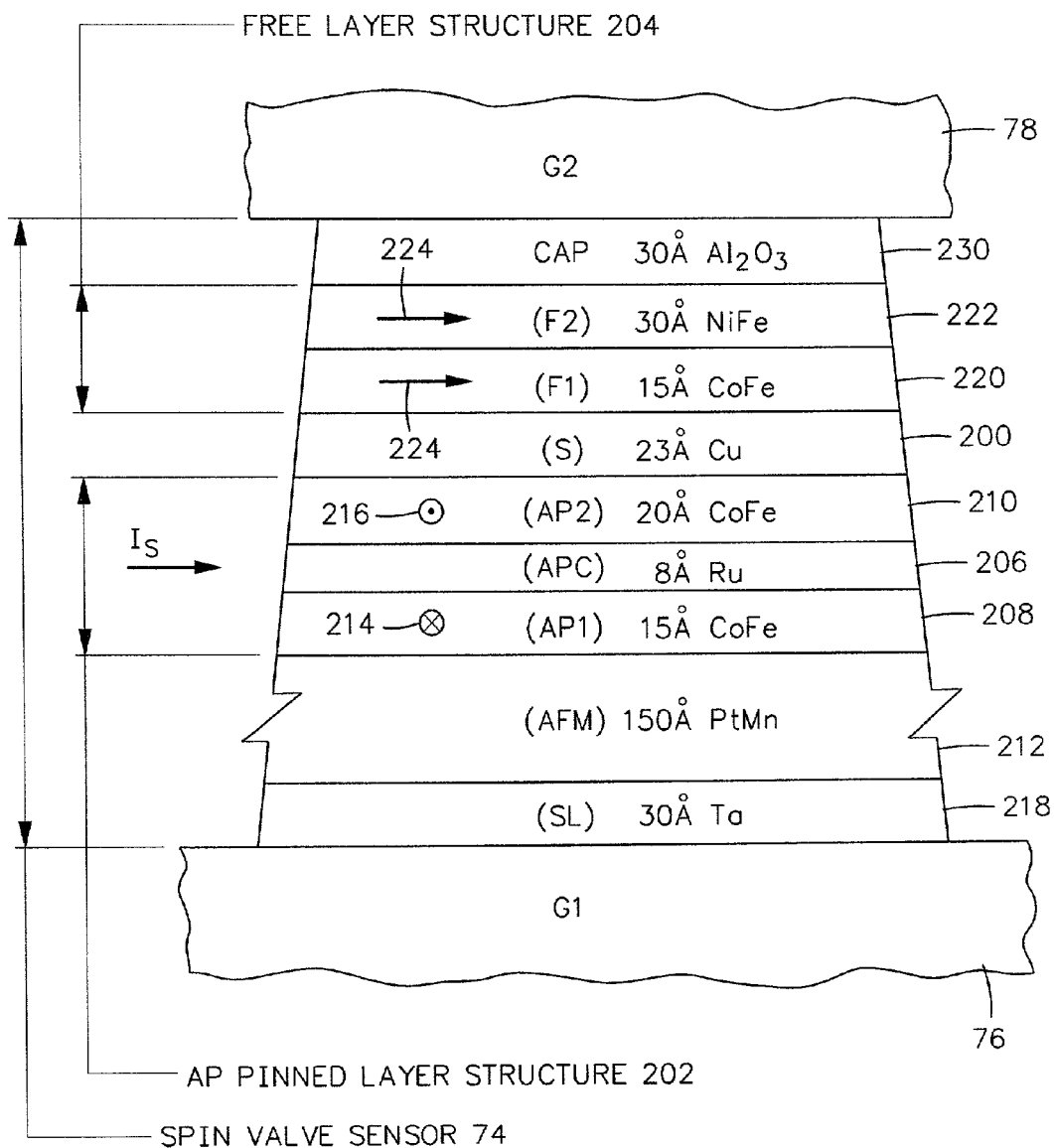
FIG. 10 is an enlarged ABS illustration of an exemplary spin valve sensor.

FIG. 10 is an enlarged ABS illustration of an exemplary spin valve sensor 74. The spin valve sensor includes a spacer layer (S) 200 which is located between an antiparallel (AP) pinned layer structure 202 and a free layer structure 204. The AP pinned layer structure 202 includes an antiparallel coupling (APC) layer 206 which is located between first and second antiparallel (AP) pinned layers (AP1) and (AP2) 208 and 210. The first AP pinned layer 208 interfaces and is exchange coupled to an antiferromagnetic (AFM) pinning layer 212 which pins a magnetic moment 214 of the first AP pinned layer perpendicular to the ABS in a direction out of the sensor or into the sensor, as shown in FIG. 10. By a strong antiparallel coupling between the first and second AP pinned layers 208 and 210 the second AP pinned layer has a magnetic moment 216 which is antiparallel to the magnetic moment 214. A seed layer (SL) 218 may be provided for the pinning layer 212 for promoting a desirable texture of the layers deposited thereon.

The free layer structure 204 may include first and second free layers (F1) and (F2) 220 and 222. The free layer structure 204 has a magnetic moment 224 which is parallel to the ABS and to the major planes of the layers in a direction from right to left or from left to right, as shown in FIG. 10. When a field signal from the rotating magnetic disk rotates the magnetic moment 224 of the free layer structure into the sensor, the magnetic moments 224 and 216 become more antiparallel which increases the resistance of the sensor to the sense current $I_S$, and when the field signal from the rotating magnetic disk rotates the magnetic moment 224 out of the sensor, the magnetic moments 224 and 216 become more parallel which decreases the resistance of the sensor to the sense current. These resistance changes are processed as playback signals by the processing circuitry 50 in FIG. 3. Exemplary thicknesses and materials for the layers are shown in FIG. 10.

The first and second hard bias layers 140 and 144 in FIG. 9 exert a magnetic field on the spin valve sensor 74 which is parallel to the ABS and parallel to the major thin film planes of the layers of the sensor. As stated hereinabove, one of the layers of the sensor is a free layer which has the magnetic moment 224 which is free to rotate upwardly and downwardly with respect to the ABS in response to field signals from the rotating magnetic disk. The purpose of the longitudinal biasing from the hard bias layers 140 and 144 is to stabilize the free layer so it is in a single magnetic domain state and to maintain the magnetic moment 224 parallel to the ABS and parallel to the major thin film planes of the layers of the sensor. Any non-uniformity in the biasing by the hard bias layers 140 and 144 results in a lack of predictability of the response of the free layer structure 204 to field signals and an unacceptable variation between read amplitudes of multiple magnetic head assemblies on a head gimbal assembly (HGA) or a head stack assembly (HSA). This unpredictability and variation in read amplitudes have been problems associated with the prior art.

The Invention

The invention overcomes the problems associated with the prior art by multiple initialization of the hard bias layers 140 and 144, shown in FIG. 9 with magnetic fields which are alternatively in opposite directions. Accordingly, the present invention originally initializes the hard bias layers 140 and 144 by applying a magnetic field $H_1$, as shown in FIG. 9, which may be parallel or antiparallel to the magnetic moment 224 in FIG. 10, followed by a magnetic field $H_2$ which is antiparallel to the magnetic field $H_1$. Multiple magnetic fields $H_N$ may be applied provided each magnetic field H is antiparallel to the preceding magnetic field H. This may be applied repetitively at any one level of fabrication of the magnetic read head after constructing the hard bias layers 140 and 144 or repetitively at selected levels of the fabrication, as discussed hereinbelow.

It should also be understood that within the embodiment, the applied magnetic field direction may be such as to require the polarity flipping of the R+ and R− sensor terminals as they are wired to the pre-amp so that in the end the HB field direction is opposite that of the current (by convention the flow of holes) direction. It is also understood that in practice, double flippings of the field direction may be sufficient and that they may need to be applied only to the UP wafer and/or UP HGAs. Furthermore, it is also understood that depending on the implementation of this invention that HB initialization at a certain level, HSA for example, may be precluded.

Figure 11:
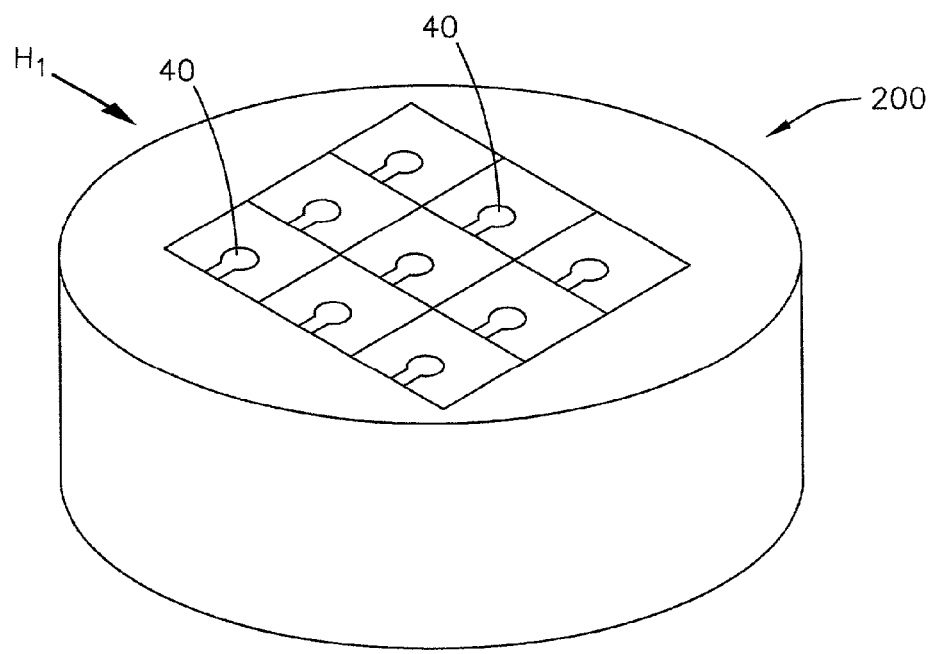
FIG. 11 is an isometric illustration of a wafer with rows and columns of magnetic head assemblies fabricated thereon with the wafer being subjected to a magnetic field $H_1$ in a first direction.
Figure 12:
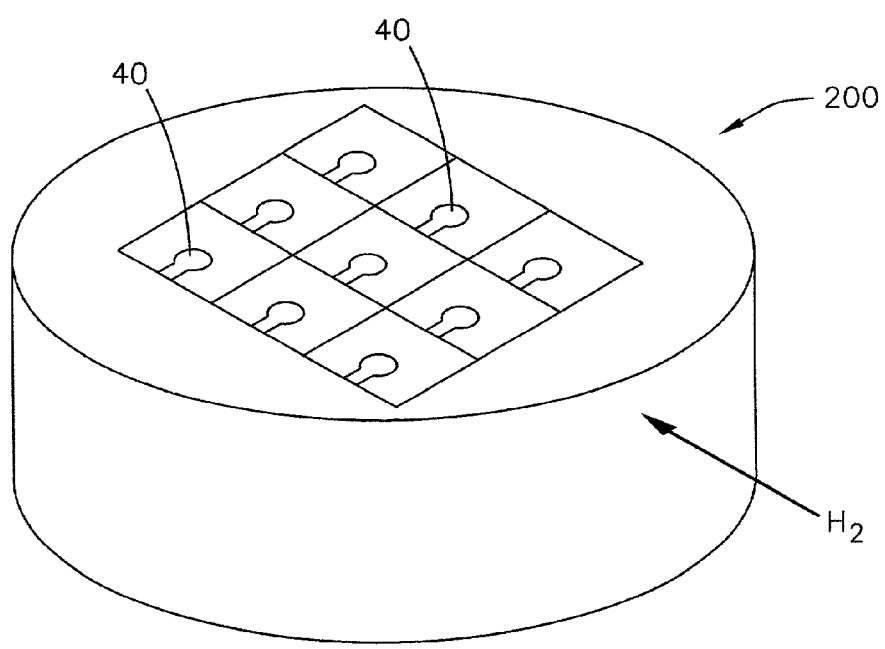
FIG. 12 is the same as FIG. 10 except the magnetic field $H_2$ is in a second direction which is antiparallel to the first direction shown in FIG. 11.

FIG. 11 is an isometric illustration of a wafer upon which multiple magnetic head assemblies 40, as shown in FIG. 6, may be fabricated. The magnetic head assemblies may or may not include the write head portion 70 shown in FIG. 6. After fabricating the magnetic head assemblies on the wafer 200 the wafer may be subjected to a magnetic field $H_1$ which is oriented in a first direction parallel to the ABS and parallel to the major thin film planes of the layers for orienting magnetic moments of the hard bias layers 140 and 144 in the same direction. In one embodiment of the invention a second field $H_2$ is applied in a direction antiparallel to the direction of the magnetic field $H_1$ in FIG. 1, as shown in FIG. 12. This switches the magnetic moments of the hard bias layers 140 and 144 in an opposite direction. It has been found that this method improves the magnetic stability of the first and second hard bias layers 140 and 144 which, in turn, improves the predictability of the read amplitude of any one magnetic head assembly or improves the uniformity of read amplitudes of multiple magnetic read head assemblies on a HGA or HSA.

Figure 13:
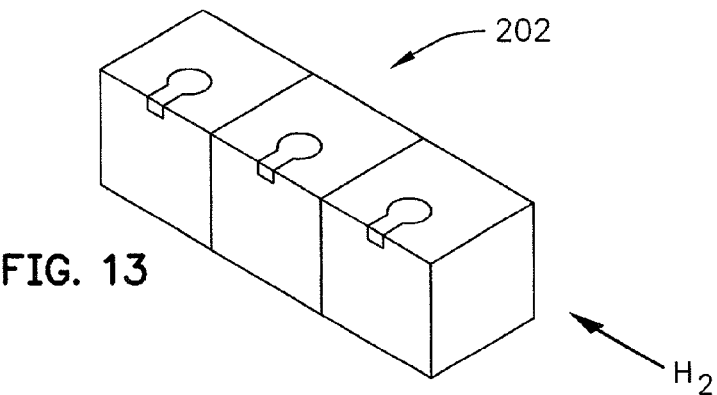
FIG. 13 is a row of magnetic head assemblies after the wafer in FIG. 11 has been diced with a magnetic field $H_2$ in a second direction which is antiparallel to the magnetic field $H_1$ in FIG. 11.
Figure 14:
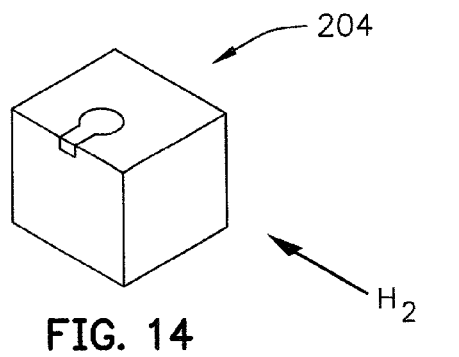
FIG. 14 is an isometric illustration of an individual magnetic head assembly after dicing the row shown in FIG. 11 with a magnetic field $H_2$ oriented in a direction antiparallel to the magnetic field $H_1$ in FIG. 11.

FIG. 13 is a row of magnetic head assemblies 202 after dicing the wafer 200 into rows of magnetic head assemblies. Another embodiment of the invention is after initializing the wafer 200 in FIG. 11 with the field $H_1$ in a first direction the row of magnetic head assemblies 202 in FIG. 13 may be next initialized by a field $H_2$ in a direction which is antiparallel to the field $H_1$ in FIG. 11. FIG. 14 is an isometric illustration of an individual magnetic head assembly 204 after dicing the row of magnetic head assemblies 202 in FIG. 13. Another embodiment of the invention is to apply a magnetic field $H_2$, as shown in FIG. 14, in a direction antiparallel to the direction of the magnetic field $H_1$ in FIG. 11.

Figure 15:
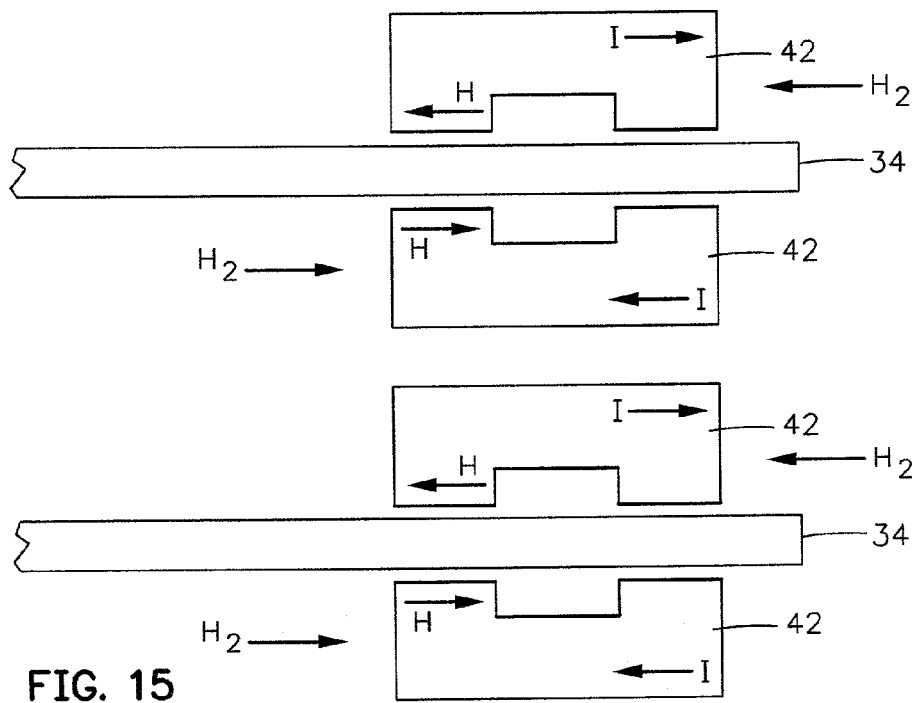
FIG. 15 is a schematic illustration of two head gimbal assemblies (HGA) wherein each head gimbal assembly has top and bottom magnetic heads and each magnetic head is being initialized by a field $H_2$ in a direction which is opposite to the direction of the field $H_1$ in FIG. 10.

FIG. 4 shows a slider 42 with a magnetic head assembly 40 (204 in FIG. 14) mounted on a head gimbal assembly (HGA) 44. Still another embodiment of the invention is to apply the magnetic field $H_2$, as shown in FIG. 4, in a direction which is antiparallel to the direction of the magnetic field $H_1$ in FIG. 11. FIG. 3 shows a head stack assembly (HSA) mounted in a magnetic disk drive wherein the HSA includes a plurality of suspensions 46 with the top and bottom suspensions supporting a single head gimbal assembly (HGA) and each of the suspensions 46 therebetween supporting a pair of HGAs. Between the sliders 42 are rotatable magnetic disks 34. A portion of the sliders 42 from the HSA in FIG. 3 are shown schematically in FIG. 15 on each side of a pair of rotatable magnetic disks 34. If initialization fields $H_2$ are employed at the HSA level each applied magnetic field $H_2$ in FIG. 15 is opposite to the preceding applied magnetic field at any preceding level such as opposite to $H_1$ at the wafer level in FIG. 11 if that is the field immediately preceding the fields $H_2$ in FIG. 15. Accordingly, the invention may be employed for applying the initialization fields consecutively in alternating directions at any one level or at any combination of levels. After mounting the HGA shown in FIG. 4, in a single magnetic head drive or in a multiple magnetic head drive as shown in FIG. 3, the sense current is oriented in a direction antiparallel to the orientation of the last applied field H.

Discussion

It should be understood that the present invention can be used for either MR or GMR type of sensors.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A method making a magnetic head assembly that has an air bearing surface (ABS) comprising the steps of:
    making a read head comprising the steps of:
        forming a read sensor;
        forming a hard bias structure magnetically coupled to the read sensor for longitudinally biasing the read sensor;
        applying a first magnetic field to the hard bias structure for orienting magnetic spins of the hard bias structure in a first direction that is parallel to said ABS and parallel to major thin film planes of layers of the read sensor; and
        applying a second magnetic field to the hard bias structure in a direction that is antiparallel to said first direction.

2. A method making a magnetic head assembly as claimed in claim 1 including the steps of:
    forming the magnetic head assembly as one magnetic head assembly of a plurality of magnetic head assemblies in rows and columns on a wafer; and
    applying said first and second magnetic fields to said wafer.

3. A method making a magnetic head assembly as claimed in claim 1 including the steps of:
    forming the magnetic head assembly as one magnetic head assembly of a plurality of magnetic head assemblies in rows and columns on a wafer;
    dicing the wafer into rows of magnetic head assemblies wherein one of the row magnetic head assemblies includes said magnetic head assembly; and
    applying said first magnetic field to said wafer and applying said second magnetic field to said one row of magnetic head assemblies.

4. A method making a magnetic head assembly that has an air bearing surface (ABS) comprising the steps of:
    making a read head comprising the steps of:
        forming a read sensor;
        forming a hard bias structure magnetically coupled to the read sensor for longitudinally biasing the read sensor;
        applying a first magnetic field to the hard bias structure for orienting magnetic spins of the hard bias structure in a first direction that is parallel to said ABS and parallel to major thin film planes of layers of the read sensor;
        applying a second magnetic field to the hard bias structure in a direction that is antiparallel to said first direction; and
        further applying one more additional magnetic fields parallel to the ABS and parallel to major thin film planes of the layers of the sensor provided each additional application of a magnetic field is oriented antiparallel to a previous application of a magnetic field.

5. A method making a magnetic head assembly that has an air bearing surface (ABS) comprising the steps of:
    making a read head comprising the steps of:
        forming a read sensor;

forming a hard bias structure magnetically coupled to the read sensor for longitudinally biasing the read sensor;

applying a first magnetic field to the hard bias structure for orienting magnetic spins of the hard bias structure in a first direction that is parallel to said ABS and parallel to major thin film planes of layers of the read sensor;

applying a second magnetic field to the hard bias structure in a direction that is antiparallel to said first direction; and forming the magnetic head assembly as one magnetic head assembly of a plurality of magnetic head assemblies in rows and columns on a wafer;

dicing the wafer into rows of magnetic head assemblies wherein one of the row of magnetic head assemblies includes said one magnetic head assembly;

dicing the row of magnetic head assemblies into individual magnetic head assemblies where one of the individual magnetic head assemblies is said one magnetic head assembly;

mounting said one magnetic head assembly on a head gimbal assembly (HGA); and applying said first magnetic field to said wafer and then applying said second magnetic field to said HGA.

6. A method making a magnetic head assembly as claimed in claim 5 further comprising the steps of:

mounting the HGA on a head stack assembly (HSA); and
mounting the HSA in a magnetic disk drive.

7. A method making a magnetic head assembly as claimed in claim 5 wherein a making of the read sensor includes the steps of forming a ferromagnetic pinned layer that has a magnetic moment;

forming an antiferromagnetic pinning layer exchange coupled to the pinned layer for pinning the magnetic moment of the pinned layer perpendicular to the ABS;

forming a ferromagnetic free layer that has a magnetic moment that is oriented parallel to the ABS and parallel to said major thin film planes of the sensor layers; and forming a nonmagnetic spacer layer between the free layer and the pinned layer.

8. A method making a magnetic head assembly as claimed in claim 7 further comprising the steps of:

making a write head including the steps of:

forming ferromagnetic first and second pole piece layers in pole tip, yoke and back gap regions wherein the yoke region is located between the pole tip and back gap regions;

forming a nonmagnetic electrically nonconductive write gap layer between the first and second pole piece layers in the pole tip region;

forming an insulation stack with at least one coil layer embedded therein between the first and second pole piece layers in the yoke region; and connecting the first and pole piece layers at said back gap region.

9. A method making a magnetic head assembly as claimed in claim 8 wherein the step of forming said hard bias structure includes the step of forming first and second hard bias layers adjacent first and second side surfaces of the sensor wherein the first and second side surfaces are perpendicular to the ABS.

10. A method making a magnetic head assembly as claimed in claim 1 wherein a making of the read sensor includes the steps of:

forming a ferromagnetic pinned layer that has a magnetic moment;

forming an antiferromagnetic pinning layer exchange coupled to the pinned layer for pinning the magnetic moment of the pinned layer perpendicular to the ABS;

forming a ferromagnetic free layer that has a magnetic moment that is oriented parallel to the ABS and parallel to said major thin film planes of the sensor layers; and forming a nonmagnetic spacer layer between the free layer and the pinned layer;

making a write head including the steps of:

forming ferromagnetic first and second pole piece layers in pole tip, yoke and back gap regions wherein the yoke region is located between the pole tip and back gap regions;

forming a nonmagnetic electrically nonconductive write gap layer between the first and second pole piece layers in the pole tip region;

forming an insulation stack with at least one coil layer embedded therein between the first and second pole piece layers in the yoke region; and connecting the first and pole piece layers at said back gap region; and wherein the step of forming said hard bias structure includes the step of forming first and second hard bias layers adjacent first and second side surfaces of the sensor wherein the first and second side surfaces are perpendicular to the ABS.

11. A method making a magnetic head assembly as claimed in claim 10 including the steps of:

forming the magnetic head assembly as one magnetic head assembly of a plurality of magnetic head assemblies in rows and columns on a wafer;

dicing the wafer into rows of magnetic head assemblies wherein one of the row magnetic head assemblies includes said one magnetic head assembly;

dicing the row of magnetic head assemblies into individual magnetic head assemblies where one of the individual magnetic head assemblies is said one magnetic head assembly;

mounting said one magnetic head assembly on a head gimbal assembly (HGA); and applying said first and second magnetic fields at any one of the wafer, row, individual or HGA level of said one magnetic head assembly or applying the first magnetic field to any one of the wafer, row, individual or HGA level of said one magnetic head assembly and the second magnetic field to any other one of the wafer, row, individual or HGA level of said one magnetic head assembly.

12. A method making a magnetic head assembly as claimed in claim 11 further comprising the steps of:

mounting the HGA on a head stack assembly (HSA); and
mounting the HSA in a magnetic disk drive.

13. A method making a magnetic head assembly as claimed in claim 12 further applying one more additional magnetic fields parallel to the ABS and parallel to major thin film planes of the layers of the sensor provided each additional application of a magnetic field is oriented antiparallel to a previous application of a magnetic field.

* * * * *